UNITED STATES PATENT OFFICE.

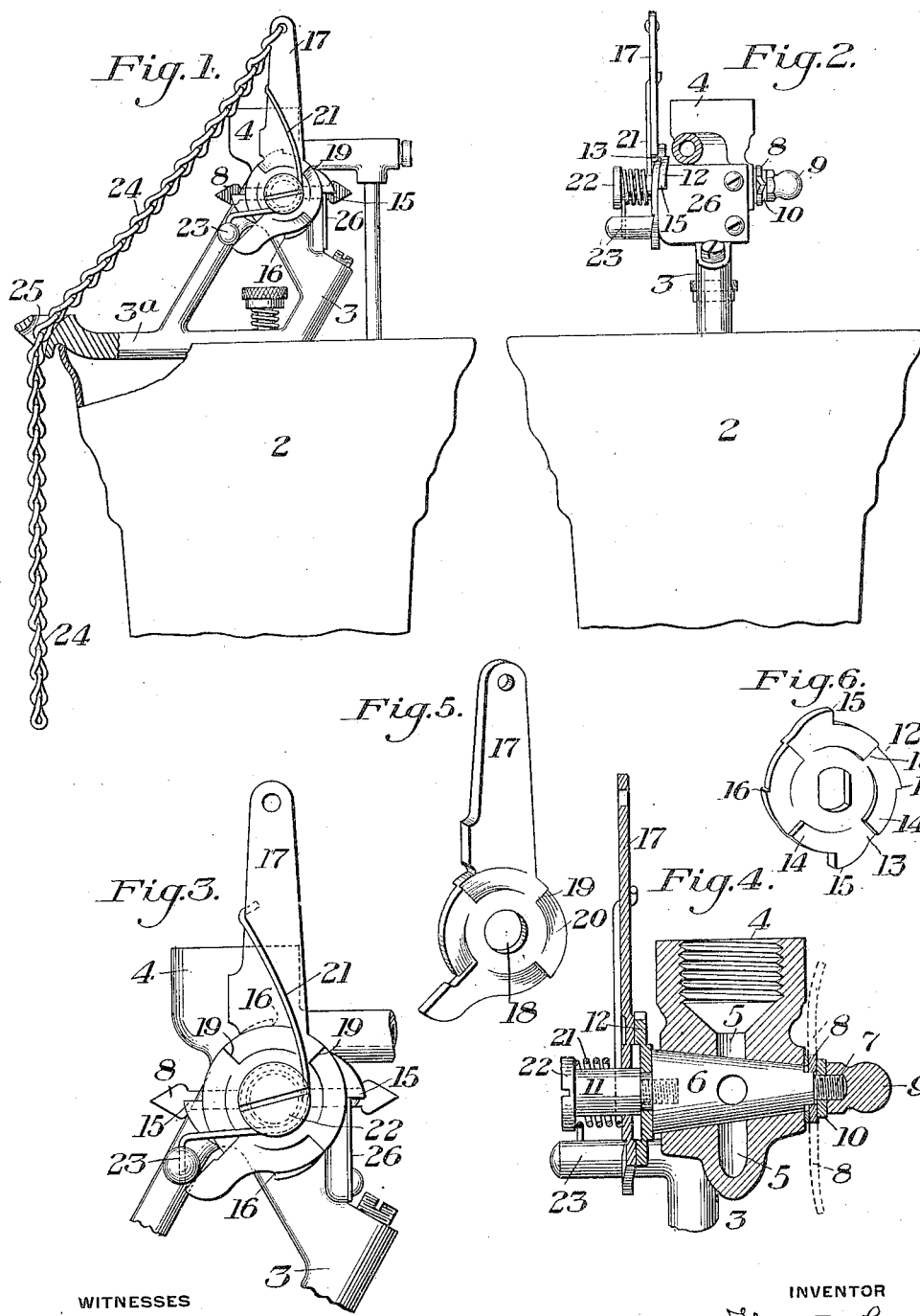

THOMAS JAMES LITLE, JR., OF WOODBURY, NEW JERSEY, ASSIGNOR TO WELSBACH LIGHT COMPANY, OF GLOUCESTER CITY, NEW JERSEY, A CORPORATION OF NEW JERSEY.

GAS VALVE OR COCK.

1,104,519. Specification of Letters Patent. Patented July 21, 1914.

Application filed March 24, 1913. Serial No. 756,414.

*To all whom it may concern:*

Be it known that I, THOMAS J. LITLE, Jr., a citizen of the United States, and a resident of Woodbury, in the county of Gloucester and State of New Jersey, have invented a new and useful Improvement in Gas Valves or Cocks, of which the following is a full, clear, and exact description, reference being had to the accompanying drawings, forming part of this specification, in which—

Figure 1 is a side view of a portion of a gas lamp having my invention applied thereto; Fig. 2 is a similar view taken at substantially right angles to Fig. 1; Fig. 3 is a side view of the valve-actuating mechanism on a larger scale; Fig. 4 is a sectional view taken through the valve plug; Fig. 5 is a detail perspective view of the actuating lever; and Fig. 6 is a similar view of the clutch member.

My invention has relation to an improvement in gas cocks or valves, and is designed to provide a device of this character having an audible signal which will be sounded only when the cock is operated to shut off the gas. It has been customary to provide gas cocks with an indicator to show the open or closed position of the valve, but when the room is dark and this indicator is not visible, the operator has no means of knowing whether the cock is open or closed, and in case the pilot light is not burning, or the lamp is not equipped with a pilot light, the cock may be left open with the gas escaping.

My invention is designed to provide an audible signal device which will emit a distinct sound when the cock is closed.
Another object of my invention is to provide a device of this character in which the signal member will act as a pawl, to prevent the valve plug from turning backwardly and partly shutting off the gas by reason of the frictional action of the operating lever when the latter springs into position for a subsequent pull on the operating chain.

In the accompanying drawings, in which I have illustrated the preferred form of my invention, the numeral 2 designates a portion of a lamp casing having secured thereto a bracket 3, formed with a connection 4 for the gas supply pipe (not shown). The connection 4 is provided with a gas passage 5, leading downwardly through the bracket to the burner of the lamp and which is controlled by a valve 6 of the turning plug type. This plug is formed with a tail projection 7, to which is secured a suitable visible indicator 8, by means of the nut 9 and washer 10. At its opposite end, the plug 6 has a projecting stem 11, to which is fixed a clutch member 12. The outer face of this member is provided with a series of clutch teeth 13, having the cam surfaces 14. The periphery of the member has ratchet teeth 15, 16, these two sets of teeth alternating with each other, and the teeth 15 having a very considerably greater radial projection than the teeth 16.

17 is an actuating lever, having an opening 18, in its hub portion, which loosely engages and turns on the projecting stem 11 of the valve plug 6. The hub portion of this lever is of circular form, and has its inner face formed with a plurality of clutch teeth 19, corresponding to the teeth 14 of the member 12, and also having corresponding cam surfaces 20.

21 is a spring coiled around the stem 11, between its head 22 and the outer face of the hub portion of the lever 17. One end of this spring is attached to the lever arm and its other end is attached to the bracket 3 at the point 23. This spring not only provides for the return of the actuating lever to normal position in operation, but it also acts to force the lever inwardly toward the clutch member 12.

24 is the usual pull chain attached to the lever 17, and which extends downwardly through a guiding eye 25, on a laterally projecting arm 3ᵃ of the bracket 3.

The element 26 is a combined pawl and signal plate which is secured to the bracket 3 in a position to cause its forward edge to engage with the teeth 15 and 16 on the clutch member 12. This plate is of spring material, so that it will snap into engagement with these teeth.

When the chain 24 is pulled downwardly, the clutch tooth on the lever hub will engage the corresponding tooth on the member 12, and thereby turn the valve plug 6 an angle of about 90°. As soon as the chain is released, the spring 21 which has been put under tension by the downward movement of the lever acts to return the lever to its normal position. During this movement of the lever, the coöperating cam surfaces 14 and 20 of the lever hub and clutch member 12 tend to separate said members, thereby compressing the spring 21. When the lever is returned to its normal position, this spring will act to move the lever into clutching position with the member 12.

The member 12 is so placed that its teeth 15 and 16 are in position to be engaged by the pawl and signal member 26 after each turning movement of the valve plug. One of the deeper teeth 15 will be engaged by this pawl and signal member when the valve is in closed position, while one of the shallower teeth 16 will be engaged when the valve is in open position. As the pawl member 26 rides over the camed peripheral edge of the member 12, adjacent to each tooth 15, it is put under considerable compression, so that it will positively snap into engagement with the shoulder of a tooth as soon as the proper position of the member 12 is reached. This snap gives an audible signal which can be readily heard. In riding over one of the teeth 16, however, comparatively little tension is put on the spring pawl, and but little, if any, noise will be emitted when the pawl engages one of these teeth. If the operator fails to catch the signal on its first occurrence, he can continue to pull the chain until the signal is heard. He then knows that the valve is being left in its closed position. As the member 26 engages said tooth on the clutch member 12 at the end of the down movement of the lever 17, it acts to effectively prevent any backward movement of the valve plug, while the lever is returning to normal position, due to friction between the hub portion of the lever and the member 12.

It will be obvious that various changes can be made in the details of the construction and arrangement of the parts, without departing from the spirit and scope of my invention as defined in the appended claims.

I claim:

1. A gas cock having an audible signal, means for actuating the cock to open and close it, an audible signal, and means operated by the movement of said cock to closed position for sounding said signal, said means being inoperative when the cock is moved to opened position; substantially as described.

2. In a gas cock, the combination of a rotary valve, an actuating device therefor, a combined pawl and signal member, and means whereby said member locks the valve in both its open and closed positions and gives a signal only when the valve is closed, substantially as described.

3. A gas cock having a rotary valve, a combined clutch and ratchet member on the stem of the valve, an actuating lever having a clutch portion to coöperate with said member, and a combined pawl and signal member arranged to snap into engagement with the ratchet teeth of said member, said teeth being of different depths, and the deeper teeth being arranged to actuate said member to produce a signal substantially as described.

4. A gas cock comprising a rotary valve, a combined clutch and ratchet member attached to said valve, an actuating lever having a clutch portion to coöperate with the clutch member, a spring for returning the lever to normal position and also acting to force its clutch portion into engagement with the clutch member, a combined pawl and signal, the clutch member having teeth, and some of said teeth being of a depth to cause the pawl and signal member to vibrate and thereby emit an audible signal; substantially as described.

5. A gas cock comprising a rotary valve having a projecting stem, a member secured to said stem and having peripheral ratchet teeth of different depths, means for rotating the valve, and a spring pawl adapted to engage one of the deeper teeth when the valve is being turned to closed position and thereby vibrate said pawl to cause it to emit an audible signal, substantially as described.

6. A gas cock comprising a rotary valve, the stem of said valve having two sets of teeth thereon of different depths, and a combined pawl and signal member adapted to engage said teeth, substantially as described.

7. A gas cock having an audible signal, means for actuating the cock to open and close it, an audible signal, and means operated by the movement of said cock to closed position for sounding said signal, said means being inoperative when the cock is moved to opened position, the signal and the actuating means also forming means for holding the cock in its set position, substantially as described.

In testimony whereof, I have hereunto set my hand.

THOMAS JAMES LITLE, Jr.

Witnesses:
EDGAR LENTON,
J. H. JOHNSON.